(12) United States Patent
Zhang et al.

(10) Patent No.: US 10,909,651 B2
(45) Date of Patent: Feb. 2, 2021

(54) GRAPHIC PROCESSOR UNIT TOPOLOGY-AWARE ALL-REDUCE OPERATION

(71) Applicant: International Business Machines Corporation, Armonk, NY (US)

(72) Inventors: Li Zhang, Yorktown Heights, NY (US); Xingbo Wu, Chicago, IL (US); Wei Zhang, Elmsford, NY (US); Yufei Ren, East Setauket, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/058,087

(22) Filed: Aug. 8, 2018

(65) Prior Publication Data
US 2020/0051201 A1 Feb. 13, 2020

(51) Int. Cl.
*G06T 1/20* (2006.01)

(52) U.S. Cl.
CPC ...................... *G06T 1/20* (2013.01)

(58) Field of Classification Search
None
See application file for complete search history.

(56) References Cited

U.S. PATENT DOCUMENTS

| 7,333,107 | B2 | 2/2008 | Papageorgiou |
| 8,375,368 | B2 | 2/2013 | Tuck et al. |
| 2007/0140244 | A1* | 6/2007 | Jia ........................... G06F 9/542 370/390 |
| 2008/0148013 | A1* | 6/2008 | Jia ......................... G06F 9/5061 712/28 |
| 2011/0113083 | A1* | 5/2011 | Shahar .............. G06F 15/17393 709/201 |

(Continued)

OTHER PUBLICATIONS

Faraji I. "Improving Communication Performance in GPU-Accelerated HPC Clusters", PhD Thesis, Queen's University, Jan. 2018. (Year: 2018).*

(Continued)

*Primary Examiner* — Patrick F Valdez
(74) *Attorney, Agent, or Firm* — Cantor Colburn LLP; Joseph Petrokaitis

(57) ABSTRACT

A computer-implemented topology-aware all-reduce method for an environment including a plurality of systems is provided. Each system of the systems includes a plurality of computing modules. The computer-implemented topology-aware all-reduce method according to aspects of the invention includes locally partitioning and scattering data slices among the computing modules of each system to produce local summation results. The local summation results are copied from the computing modules to corresponding host memories of the f systems. A cross system all-reduce operation is executed among the systems to cause an exchange of the local summation results across the host memories and a determination of final summation partitions from the local summation results. The final summation partitions are copied from the host memories to the corresponding computing modules of each system. The final summation partitions are forwarded to all graphical processing units (GPUs) to cause a determination of final summation results therefrom.

6 Claims, 7 Drawing Sheets

(56) References Cited

U.S. PATENT DOCUMENTS

| | | | |
|---|---|---|---|
| 2012/0180030 A1 | 7/2012 | Crutchfield et al. | |
| 2016/0323150 A1* | 11/2016 | Heinz | H04L 45/08 |
| 2017/0098171 A1 | 4/2017 | Kumar et al. | |
| 2017/0153998 A1* | 6/2017 | Fong | G06F 13/366 |
| 2017/0220949 A1 | 8/2017 | Feng et al. | |
| 2017/0300830 A1 | 10/2017 | Kadav et al. | |
| 2018/0067894 A1* | 3/2018 | Doi | G06N 10/00 |
| 2019/0205745 A1* | 7/2019 | Sridharan | G06F 9/50 |

OTHER PUBLICATIONS

Tipparaju et al, "Fast Collective Operations Using Shared and Remote Memory Access Protocols on Clusters", Proc. IPDPS'03, 2003. (Year: 2003).*

Faraji et al, "Exploiting heterogeneity of communication channels for efficient GPU selection on multi-GPU nodes", Parallel Computing, vol. 68, pp. 3-16, 2017. (Year: 2017).*

Faraji et al, "Design considerations for GPU-aware collective communications in MPI", Concurrency and Computation: Practice and Experience, 30(17), May 18, 2018. (Year: 2018).*

Ben-Nun et al "Groute: An Asynchronous Multi-GPU Programming Model for Irregular Computations", PPoPP '17, ACM, Feb. 2017. (Year: 2017).*

Anonymous, "An Apparatus for Leveraging General Purpose Graphics Processing Units for JSON Acceleration in Front-End Cache", IPCOM000234730D, 6 pages.

Anonymous, "Instruction-Set Extendible GPU:", IPCOM000248804D, 5 pages.

Anonymous, "Method and Apparatus for Seemless GPU Enablement on Stream Computing Platform:", IPCOM000245119D, 5 pages.

Anonymous, "Topology-Aware Resource Allocation in Multi-GPU Architecture:",IPCOM000247369D, 5 pages.

Nvidia Collective Communication Library (NNCL), DU-08730-210_v01, 2017, 12 pages.

* cited by examiner

GRAPHIC PROCESSOR UNIT TOPOLOGY-AWARE ALL-REDUCE OPERATION

BACKGROUND

The present invention relates in general to all-reduce operations. More specifically, the present invention relates to graphic processor unit (GPU) topology-aware all-reduce operations.

So called "all-reduce" operations are common in high performance computing to aggregate results from large collections of computing modules. Also, all-reduce operations can be used in distributed deep learning to obtain an average of trained parameter values of a large number of learners. Because all-reduce operations occupy a significant portion of time in a data processing cycle, there is a need to optimize performance of these all-reduce operations.

SUMMARY

According to one or more embodiments of the invention, a computer-implemented topology-aware all-reduce method for an environment including a plurality of systems is provided. Each system of the plurality of systems includes a plurality of computing modules. The computer-implemented topology-aware all-reduce method according to aspects of the invention includes locally partitioning and scattering data slices among the plurality of computing modules of each system to produce local summation results. The local summation results are copied from the plurality of computing modules to corresponding host memories of the plurality of systems. A cross system all-reduce operation is executed among the plurality of systems to cause an exchange of the local summation results across the host memories and a determination of final summation partitions from the local summation results. The final summation partitions are copied from the host memories to the corresponding plurality of computing modules of each system. The final summation partitions are forwarded to all graphical processing units (GPUs) to cause a determination of final summation results therefrom.

According to embodiments of the invention, the computer-implemented topology-aware all-reduce method described herein can be implemented as a system and/or a computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Figure 1A:
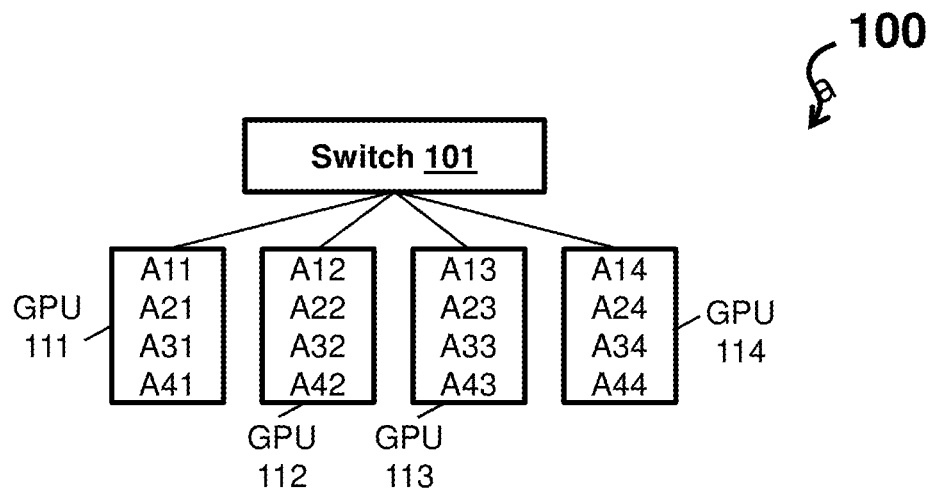
FIG. 1A depicts a system according to one or more embodiments of the invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, an all-reduce operation involves computations and communications. Regarding the computations of the all-reduce operation, each of a plurality of parties (e.g., GPUs) has a number $x_i$ and resides on a network. Then, given a commutative and associative operator $\oplus$ and a number i of parties, the all-reduce operation computes a result z based on Equation 1 and distributes the result z to all parties. Examples of the operator $\oplus$ include addition, multiplication, or XOR. Further, regarding the communications of the all-reduce operation, communication time depends on a topology of the network and a data distribution pattern.

$$x_1 \oplus x_2 \oplus \ldots \oplus x_i = z \qquad \text{Equation 1}$$

Turning now to an overview of the aspects of the invention, one or more embodiments of the invention address the above-described shortcomings of the prior art by maximizing system throughput (by knowing the bandwidth of all links), supporting different numbers of GPUs hosts (GPUs can vary from host to host), and/or providing a modular design to exploit different cross system all-reduce and local GPU all-reduce schemes. Thus, embodiments of the invention described herein are necessarily rooted in GPUs to perform proactive operations to overcome problems specifically arising in the realm of all-reduce operations.

The above-described aspects of the invention address the shortcomings of the prior art by providing a GPU topology-aware all-reduce operation that is cognizant of links with different bandwidths and how to account for these different bandwidths. That is, the topology-aware all-reduce knows all the bandwidths of all the links and determines has to perform the all-reduce in the fastest manner (optimizes the operation). Further, the GPU topology-aware all-reduce operation provides communication between GPUs across systems. Note that embodiments of the invention can also be applied to other accelerator devices, such as application-specific integrated circuits (ASICs), field programmable gate arrays (FPGAs), and other deep learning chips.

In view of the above, embodiments of the invention disclosed herein may include system, method, and/or computer program product (herein a system) that optimizes performance of all-reduce operations. Further, in accordance with one or more embodiments of the invention, the system optimized performance by executing a GPU topology-aware all-reduce operation.

Figure 1B:
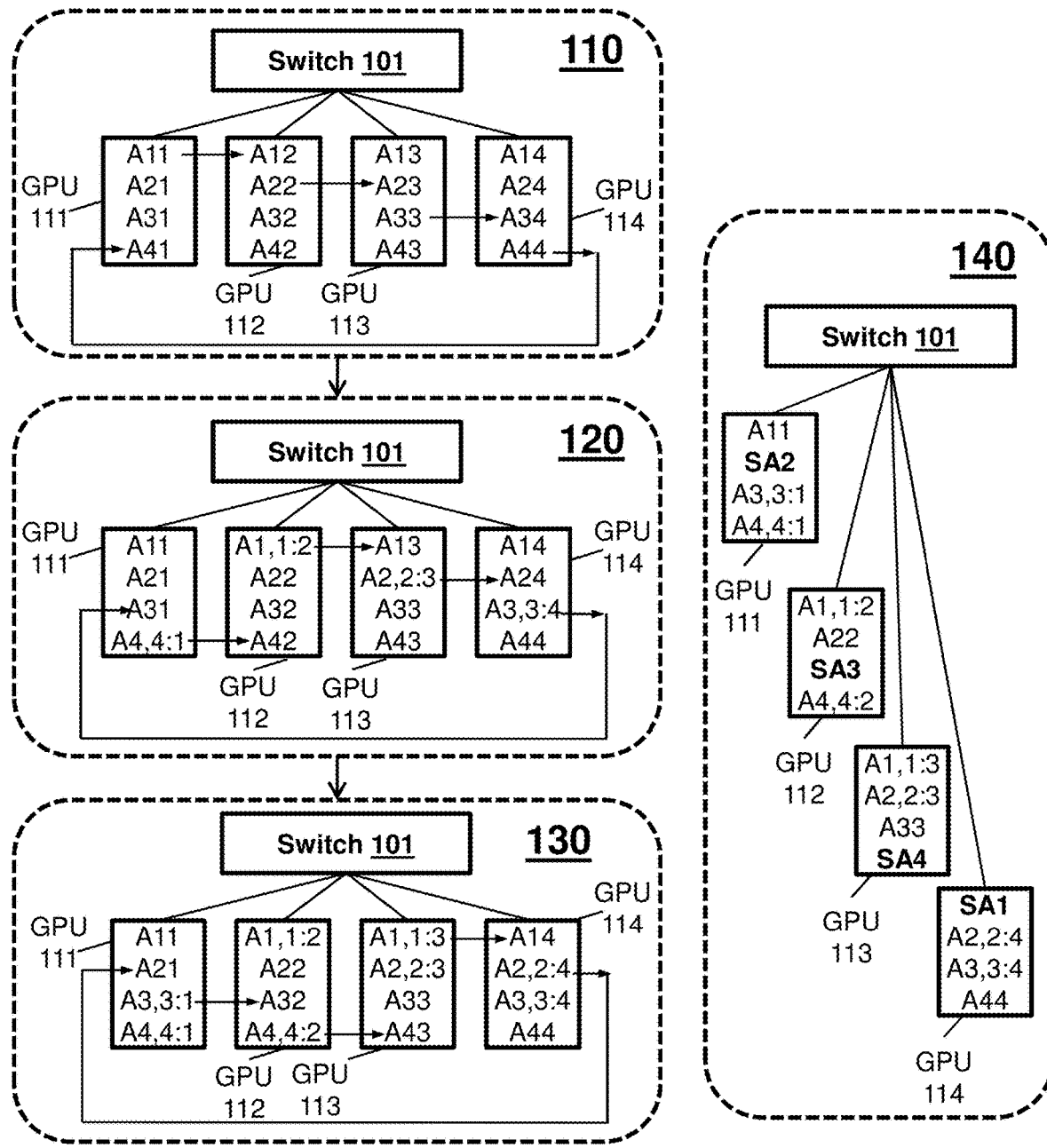
FIG. 1B a system depicted as a schematic flow of a first stage of a ring based all-reduce operation according to one or more embodiments of the invention.

Turning now to a more detailed description of aspects of the invention, FIG. 1A depicts a system 100 according to one or more embodiments of the invention. Further, FIG. 1B shows a system 100 depicted as a schematic flow of a first stage of a ring based all-reduce operation according to one or more embodiments of the invention.

The system 100 is a programmable computer system capable of being programmed to implement the all-reduce algorithms described herein. The system 100 can be an electronic, computer framework comprising and/or employing any number and combination of computing device and networks utilizing various communication technologies, as described herein. The system 100 can be easily scalable, extensible, and modular, with the ability to change to different services or reconfigure some features independently of others.

For instance, the system 100 can be a computer server in a server rack at a datacenter. The computer server can include multiple internal ports that support a plurality of parties, such as GPUs. As shown in FIG. 1A, the system 100 comprises a switch 101 in communication with GPUs 111, 112, 113, 114. In accordance with one or more, each of the GPUs 111, 112, 113, 114 can be referred to as a computing module or a learner. The switch 101 can also be in the rack, be referred to as a top/bottom of the rack switch, and be hard wired to each of the GPUs 111, 112, 113, 114. The switch can be further connected to other switches and environments in other racks (not shown). Each of the GPUs 111, 112, 113, 114 includes data partitioned into multiple slices. As shown, the data is partitioned into four slices.

The first stage of the ring based all-reduce operation is a reduce-scatter in NVIDIA Collective Communications Library (NCCL) operation that includes three steps 110, 120, and 130. At the concluding of the first stage, of the GPUs 111, 112, 113, 114 includes slice results as shown in a result 140.

At a first step 110, each of the GPUs 111, 112, 113, 114 sends a slice to the "next" GPU. For instance, a first GPU 111 sends a data slice A11 to a second GPU 112, the second GPU 112 sends a data slice A22 to a third GPU 113, the third GPU 113 sends a data slice A33 to a fourth GPU 114, and the fourth GPU 114 sends a data slice A44 to the first GPU 111. Then, upon receiving the data slice, each of the GPUs 111, 112, 113, 114 computes a partial sum.

At a second step 120, each of the GPUs 111, 112, 113, 114 sends a partial sum to the "next" GPU. For instance, the first GPU 111 sends a partial sum A4, 4:1 to the second GPU 112, the second GPU 112 sends a partial sum A1, 1:2 to the third GPU 113, the third GPU 113 sends a partial sum A2, 2:3 to the fourth GPU 114, and the fourth GPU 114 sends a partial sum A3, 3:4 to the first GPU 111. Then, upon receiving the partial sum, each of the GPUs 111, 112, 113, 114 computes a subsequent partial sum.

At a third step 130, each of the GPUs 111, 112, 113, 114 sends a subsequent partial sum to the "next" GPU. For instance, the first GPU 111 sends a subsequent partial sum A3, 3:1 to the second GPU 112, the second GPU 112 sends a subsequent partial sum A4, 4:2 to the third GPU 113, the third GPU 113 sends a subsequent partial sum A1, 1:3 to the fourth GPU 114, and the fourth GPU 114 sends a subsequent partial sum A2, 2:4 to the first GPU 111. Then, upon receiving the subsequent partial sum, each of the GPUs 111, 112, 113, 114 computes a slice result.

The result 140 depicts that the first GPU 111 holds the slice result SA2 for a second slice, the second GPU 112 holds the slice result SA3 for a third slice, the third GPU 113 holds the slice result SA4 for a fourth slice, and the fourth GPU 114 holds the slice result SA1 for a first slice.

With the conclusion of the first stage of the ring based all-reduce operation, the system 100 executes a second stage that includes an all-gather in NCCL operation. The all-gather in NCCL operation includes three steps, each of which forwards a slice result resident on each of the GPUs 111, 112, 113, 114 to a next GPU so that all the parties have each slice result.

In total, the example here in of the ring based all-reduce operation includes 6 steps total; however, a number of steps S for a ring based all-reduce operation is computed based on a number of learners N according to Equation 2.

$$2(N-1)=S \qquad \text{Equation 2}$$

Further, as each step takes an amount of time T according to Equation 3 (where D is data size and BW is bandwidth), a total time Z for a ring based all-reduce operation can be determined according to Equation 4.

$$D/N/BW=T \qquad \text{Equation 3}$$

$$S*T=Z \qquad \text{Equation 4}$$

In this way, when all the links have the same speed, then the ring based all-reduce operation work properly. However, as the total time Z is dictated by a slowest link (e.g., a minimum bandwidth), when one or more links vary, the ring based all-reduce operation fails to provide maximal system throughput.

Figure 2:
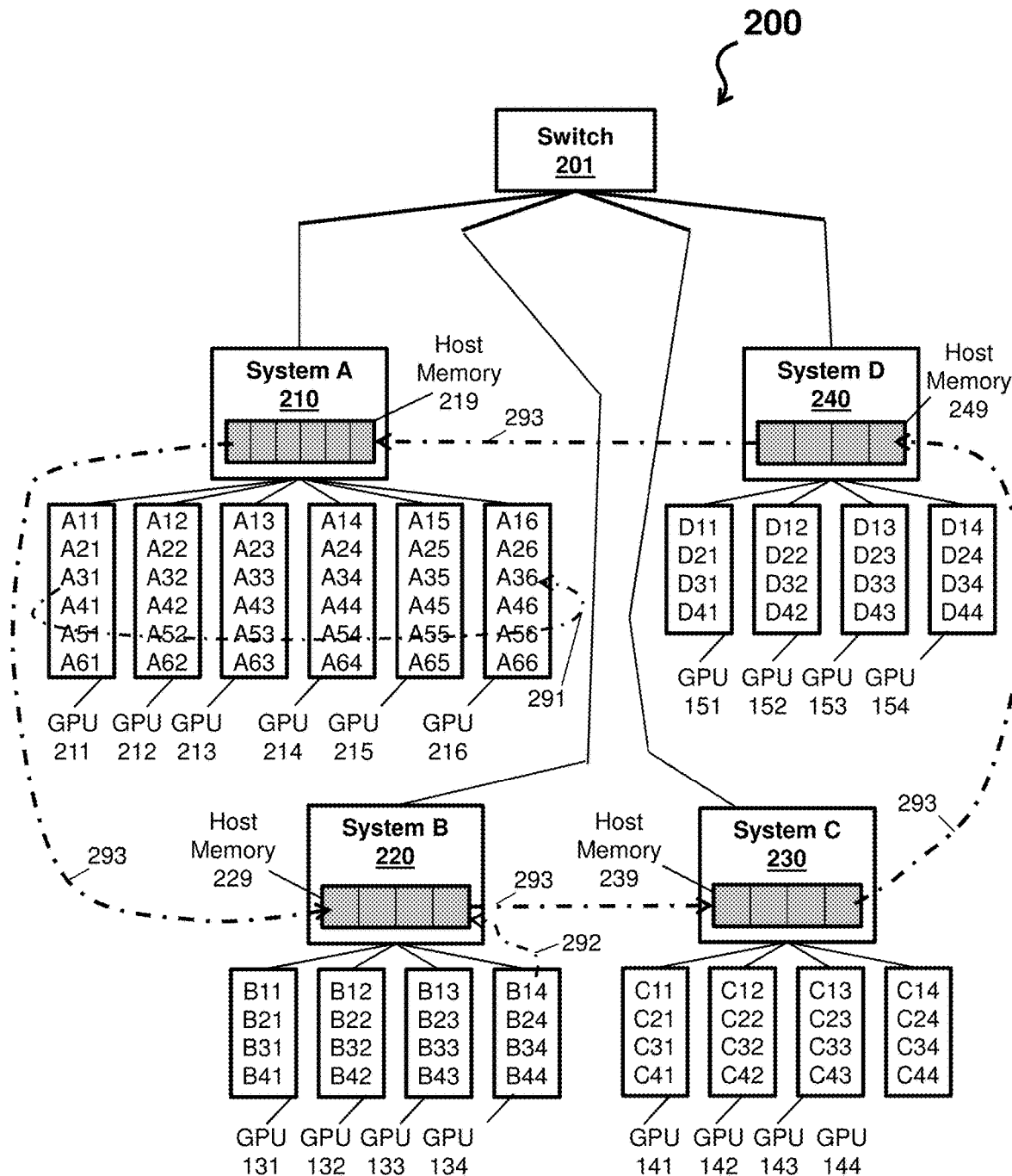
FIG. 2 depicts a schematic of a GPU topology-aware all-reduce operation according to one or more embodiments of the invention.

FIG. 2 depicts an environment 200 configured and arranged to execute a GPU topology-aware all-reduce operation according to one or more embodiments of the invention. The environment 200 includes a switch 201 in communication with one or more systems 210, 220, 230, 240. Each of the one or more systems 210, 220, 230, 240 is a machine comprising host hardware/software that manages one or more learners (e.g., computing modules). For instance, each of the one or more systems 210, 220, 230, 240 can be a computer server in a server rack at a datacenter. The computer server can include multiple internal ports that support computing modules, such as GPUs. The switch 201 can also be in the rack, such as a top/bottom of the rack switch, and be hard wired to each of the one or more systems 210, 220, 230, 240. The switch 201 can be further connected to other switches and environments in other racks (not shown).

As shown in FIG. 2, the switch 201 is in communication with a System A 210, which includes six learners (e.g., GPUs 211, 212, 213, 214, 215, and 216) and a host memory 219. The switch 201 is in communication with a System B 220, which includes four learners (e.g., GPUs 221, 222, 223, and 224) and a host memory 229. The switch 201 is in communication with a System C 230, which includes four learners (e.g., GPUs 231, 232, 233, and 234) and a host memory 239. The switch 201 is in communication with a System D 240, which includes four learners (e.g., GPUs 241, 242, 243, and 244) and a host memory 249.

Note that due to the layout of the 18 GPUs of the environment 200, the ring based all-reduce operation is not effective. Further, the communications within each of the one or more systems 210, 220, 230, 240 are faster (e.g., BW among GPUs within a system using NCCL) than the communications to and from the switch 201 (e.g., through switch 201). Thus, the environment 200 is not homogeneous. In turn, as the communications to and from the switch 201 are slower, the bandwidth inside the one or more systems 210, 220, 230, 240 would be wasted with the ring based all-reduce operation.

In contrast to the ring based all-reduce operation, the GPU topology-aware all-reduce operation is cognizant of links with different bandwidths and how to account for these different bandwidths. That is, the topology-aware all-reduce knows all the bandwidths of all the links and determines has to perform the all-reduce in the fastest manner (optimizes the operation). Further, the GPU topology-aware all-reduce operation provides communication between GPUs across systems through the host memories 219, 229, 239 249, 259. That is, in operation, the GPU topology-aware all-reduce operation fully exploits the fast GPU communication within the one or more systems 210, 220, 230, 240, utilize the host memories 219, 229, 239 249, 259 as proxy to communicate across the environment 200, and pipelines by partitioning data into chunks to overlap local GPU operations with cross environment operations. Note that all GPUs on the same host are managed by one process.

Figure 3:
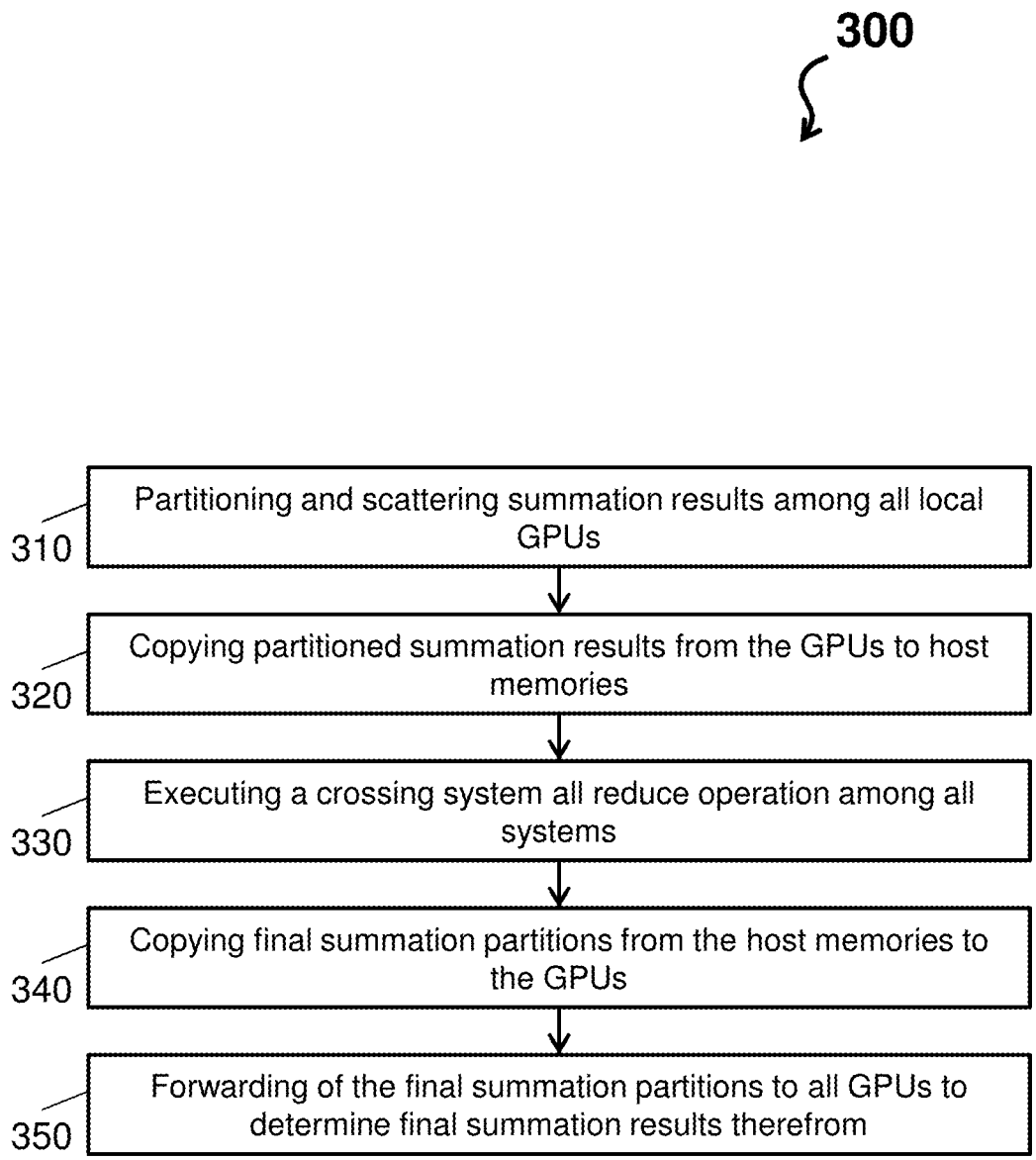
FIG. 3 depicts a process flow in accordance with one or more embodiments of the invention.

FIG. 3 depicts a process flow 300 in accordance with one or more embodiments of the invention. The process flow 300 is an example of the GPU topology-aware all-reduce operation executing in the environment 200 of FIG. 2, but is not limited thereto. The following description of the process flow 300 will refer alternately to the operations performed as part of the process flow 300 and the environment 200 that carries out the operation(s).

The process flow 300 beings at block 310, where the environment 200 performs a partitioning and scattering of summation results among all local GPUs. In this regard, each of the local nodes executes a "NCCL reduce-scatter" to forward and sum data slices across the GPUs. For example, the GPUs 211, 212, 213, 214, 215, 216 internally partition and scatter the summation results independent of the other GPUs (e.g., see the dashed-arrow 291) to produce local sums.

At block 320, the environment 200 performs a copying of partitioned summation results from GPUs to host memories. In this regard, each of the local nodes executes a "cudaMemcpy." The cudaMemcpy enables the summation results or local sums to be copied from the GPUs 221, 222, 223, and 224 to the host memory 229 independent of the other host memories (e.g., see the dashed-arrow 292).

At block 330, the environment 200 executes a crossing system all-reduce operation among all systems (e.g., System A 210, System B 220, System C 230, and System 240), and the environment 200 receives benefits come from non-blocking asynchronous message passing interface (MPI) calls. In this regard, each of the local nodes executes a "Multi-Thread MPI AllReduce" the exchanges the local sums between the systems. The host memories themselves (e.g., the host memory 219, the host memory 229, the host memory 239, and the host memory 249) perform the crossing system all-reduce (e.g., see the dashed-arrows 293) via the switch 201. In turn, each system determines a final summation partitions from the exchanged local sums.

At block 340, the environment 200 performs a copying of the final summation partitions from host memories to GPU memory locations. In this regards, each of the systems executes a reverse cudaMemcpy. At block 350, the environment 200 performs a forwarding of the final summation partitions to all GPUs, which determine final summation results therefrom. In this regard, each of the local nodes executes a "NCCL AllGather" for the final sums. Note that the operations at block 310, 320, 330, 340, and 350 are asynchronized.

Figure 4:
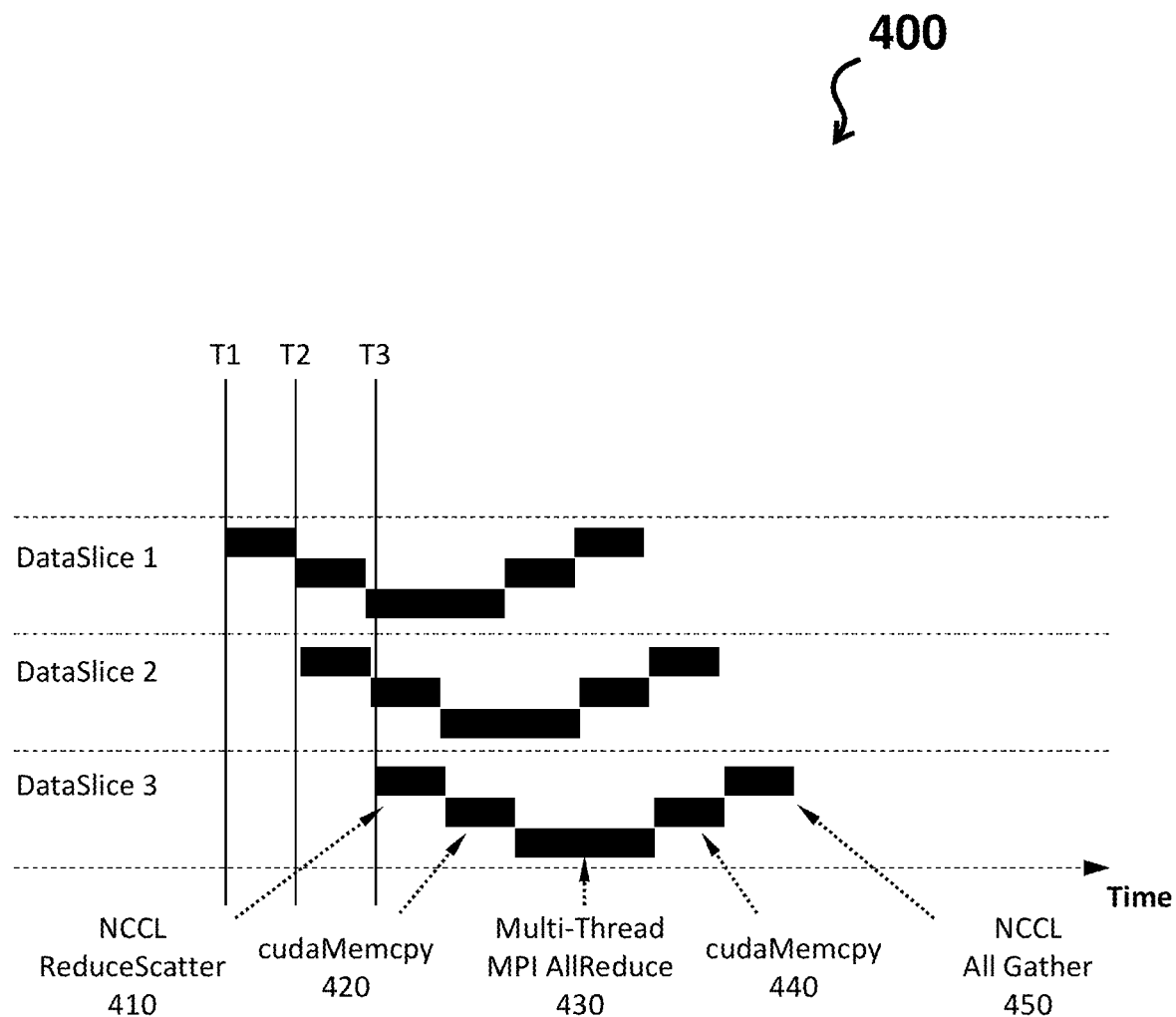
FIG. 4 depicts a processing diagram of a pipelining scheme in accordance with one or more embodiments of the invention.

In addition, the process flow 300 can include pipelining by partitioning data into slices to overlap local GPU operations with cross system operations. Turning now to FIG. 4, a processing diagram 400 of a pipelining scheme is shown in accordance with one or more embodiments of the invention. The processing diagram 300 shows that multiple data slices are processed in accordance with the process flow of FIG. 3. That is, the NCCL Reduce Scatter 410 operation aligns with block 310 of FIG. 3; the cudaMemcpy 420 operation aligns with block 320 of FIG. 3; the Multi-Thread MPI AllReduce 430 operation aligns with block 330 of FIG. 3; the cudaMemcpy 440 operation aligns with block 340 of FIG. 3; and the NCCL All Gather 450 operation aligns with block 350 of FIG. 3.

As shown in FIG. 4, each of the multiple data slices are initiated at a different time. For instance, DataSlice 1 is initiated at T1; DataSlice 2 is initiated at T2; and DataSlice 3 is initiated at T3. By initiating the data slices at different times, each portion of the topology-aware all-reduce operation can be performed at a different time, thereby different processing part of the environment (e.g., the environment 200 of FIG. 2) are being used. For instance, at time T3, a switch is performing the multi-thread MPI AllReduce 430 on data slice 1, a host memory is performing the cudaMemcpy 420 on Data Slice 2, and a set of GPUs are performing the NCCL ReduceScatter 410 on Data Slice 3. Thus, because the topology-aware all-reduce operation is a multi-stage operation, the pipelining scheme creates multiple iterations of the topology-aware all-reduce operation so that multiple stages are executing simultaneous but at different levels.

Figure 5:
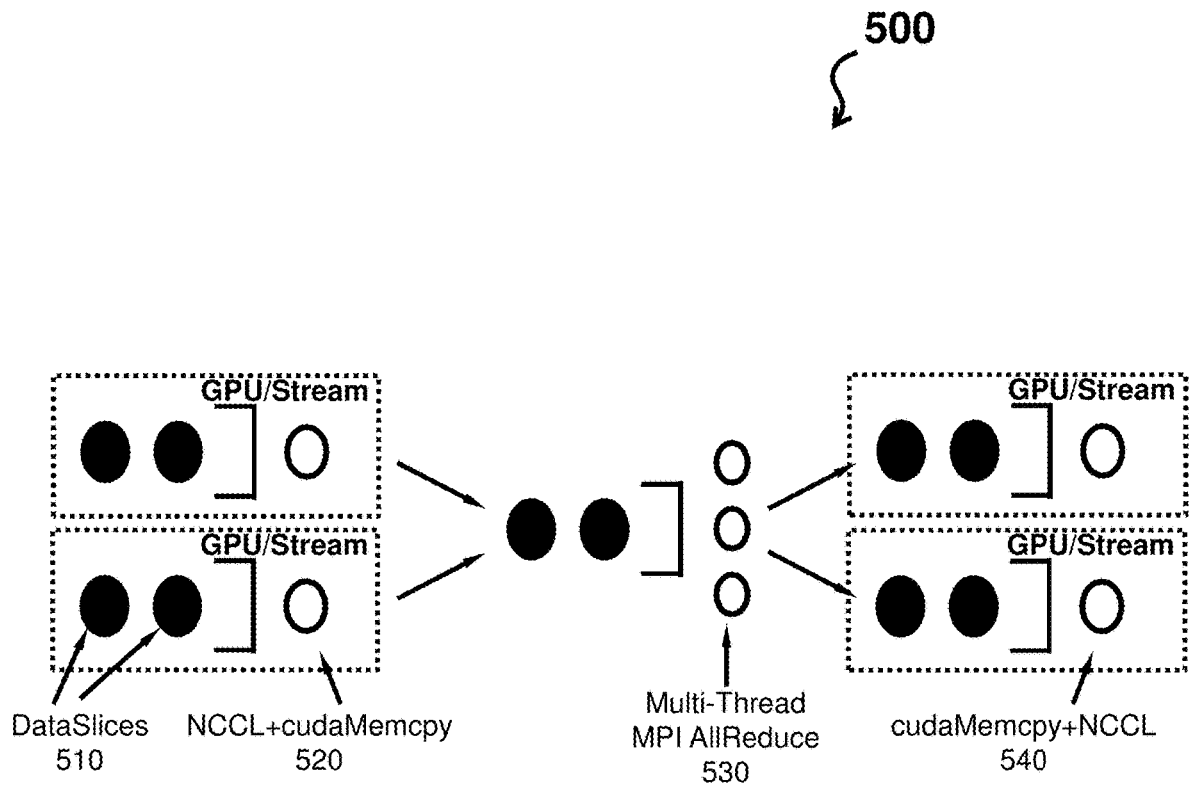
FIG. 5 depicts a processing schematic of a pipelining scheme in accordance with one or more embodiments of the invention.

FIG. 5 depicts a processing schematic 500 of a pipelining scheme in accordance with one or more embodiments of the invention. The processing schematic 500 includes one stream per GPU, where each GPU receives two data slices 510 and executes a NCCL ReduceScatter+cudaMemcpy 520. Then, the processing schematic 500 includes issuing a non-blocking multi-threaded MPIAllReduce 530. Upon finishing all data slices, each GPU executes a cudaMemcpy+NCCL AllGather 540.

Figure 6:
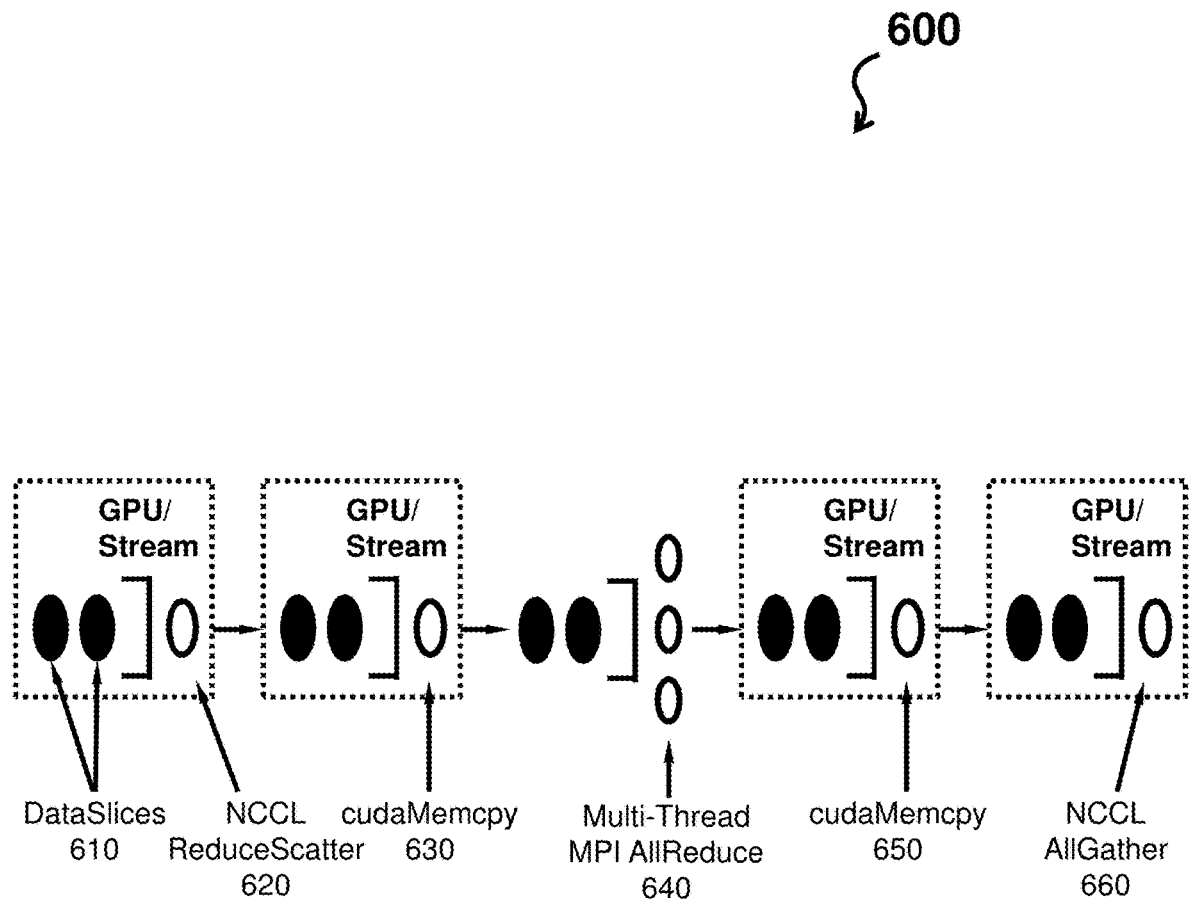
FIG. 6 depicts a processing schematic of an optimized pipelining scheme in accordance with one or more embodiments of the invention.

FIG. 6 depicts a processing schematic 600 of an optimized pipelining scheme in accordance with one or more embodiments of the invention. The processing schematic 500 includes two streams per GPU (e.g., two data slices 610 per steam), with each stream including a NCCL ReduceScatter 620 and an issuing of a non-blocking cudaMemcpy 630. Further, the NCCL, then issues a non-blocking cudaMemcpy to host memory 640. The cudaMemcpy stream 650 executes next. The cudaMemcpy stream 650, upon finishing all data slices, copies completed MPIAllReduce data to GPU memory, then issues a NCCL AllGather 660 (i.e., processes NCCL AllGather requests).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments of the invention, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented topology-aware all-reduce method for an environment, the environment including a plurality of systems and a switch in communication with the plurality of systems, each system of the plurality of systems including a plurality of computing modules comprising a plurality of graphic processing units (GPUs), the computer-implemented topology-aware all-reduce method comprising:
   locally partitioning and scattering data slices among the plurality of computing modules of each system to produce local summation results;
   internally copying the local summation results from the plurality of computing modules to corresponding host memories of the plurality of systems;
   facilitating by the switch, a cross system all-reduce operation among the plurality of systems to cause an exchange of the local summation results across the host memories and a determination of final summation partitions from the local summation results;
   internally copying the final summation partitions from the host memories to the corresponding plurality of computing modules of each system;
   forwarding the final summation partitions to all GPUs to cause a determination of final summation results therefrom; and
   executing an optimized pipelining scheme to create multiple iterations of the topology-aware all-reduce operation,
   wherein the topology-aware all-reduce method is asynchronous across the environment,
   wherein the optimized pipelining scheme provides two streams per computing module with each of the two streams comprising a ReduceScatter and issuing of a non-blocking cudaMemcpy.

2. The computer-implemented topology-aware all-reduce method of claim 1, wherein communications between the switch and the plurality of systems is slower than internal communications between the host memories and the corresponding plurality of computing modules.

3. A computer program product comprising a computer readable storage medium having program instructions for executing a topology-aware all-reduce method embodied therewith, the program instructions executable by an environment including a plurality of systems and a switch in communication with the plurality of systems, each system of the plurality of systems including a plurality of computing modules comprising a plurality of graphic processing units (GPUs), the program instructions executable to cause:
   locally partitioning and scattering data slices among the plurality of computing modules of each system to produce local summation results;
   internally copying the local summation results from the plurality of computing modules to corresponding host memories of the plurality of systems;
   facilitating by the switch, a cross system all-reduce operation among the plurality of systems to cause an exchange of the local summation results across the host memories and a determination of final summation partitions from the local summation results;
   internally copying the final summation partitions from the host memories to the corresponding plurality of computing modules of each system;
   forwarding the final summation partitions to all GPUs to cause a determination of final summation results therefrom; and
   executing an optimized pipelining scheme to create multiple iterations of the topology-aware all-reduce operation,
   wherein the topology-aware all-reduce method is asynchronous across the environment,
   wherein the optimized pipelining scheme provides two streams per computing module with each of the two streams comprising a ReduceScatter and issuing of a non-blocking cudaMemcpy.

4. The computer program product of claim 3, wherein communications between the switch and the plurality of systems is slower than internal communications between the host memories and the corresponding plurality of computing modules.

5. An environment including a plurality of systems and a switch in communication with the plurality of systems, each system of the plurality of systems including a plurality of computing modules comprising a plurality of graphic processing units (GPUs), the environment executing a topology-aware all-reduce operation comprising:
   locally partitioning and scattering data slices among the plurality of computing modules of each system to produce local summation results;
   internally copying the local summation results from the plurality of computing modules to corresponding host memories of the plurality of systems;
   facilitating by the switch, a cross system all-reduce operation among the plurality of systems to cause an exchange of the local summation results across the host memories and a determination of final summation partitions from the local summation results;
   internally copying the final summation partitions from the host memories to the corresponding plurality of computing modules of each system;
   forwarding the final summation partitions to all GPUs to cause a determination of final summation results therefrom; and
   executing an optimized pipelining scheme to create multiple iterations of the topology-aware all-reduce operation,
   wherein the topology-aware all-reduce method is asynchronous across the environment,
   wherein the optimized pipelining scheme provides two streams per computing module with each of the two streams comprising a ReduceScatter and issuing of a non-blocking cudaMemcpy.

6. The environment of claim 5, wherein communications between the switch and the plurality of systems is slower than internal communications between the host memories and the corresponding plurality of computing modules.

* * * * *